United States Patent [19]

Kummer et al.

[11] Patent Number: 4,793,456

[45] Date of Patent: Dec. 27, 1988

[54] VARIABLE RATIO CLUTCH LEVER

[75] Inventors: Martin E. Kummer, Auburn; Richard A. Flotow, Butler, both of Ind.

[73] Assignee: Dana Corporation, Toledo, Ohio

[21] Appl. No.: 32,725

[22] Filed: Mar. 31, 1987

[51] Int. Cl.[4] .............................................. F16D 13/44
[52] U.S. Cl. .................. 192/99 A; 192/70.3; 74/516
[58] Field of Search .............. 192/99 A, 70.3, 70.29; 74/516, 518

[56] References Cited

U.S. PATENT DOCUMENTS

| | | | |
|---|---|---|---|
| 2,037,610 | 4/1936 | Wörner. | |
| 2,880,835 | 4/1959 | Hass | 192/99 A |
| 4,332,314 | 6/1982 | Flotow | 192/99 A X |
| 4,503,959 | 3/1985 | Flotow | 192/70.3 |
| 4,601,377 | 7/1986 | Flotow et al. | 192/70.3 X |

Primary Examiner—Rodney H. Bonck
Assistant Examiner—Richard M. Lorence
Attorney, Agent, or Firm—Marshall & Melhorn

[57] ABSTRACT

An apparatus and a method are disclosed for varying the effective length of the levers which actute a collector ring in a clutch. Each of the levers includes a pair of noses which are angled toward the inner end of the levers and toward the collector ring to provide a point contact which moves along the surface of the nose as the levers are rotated by a throw-out bearing. Thus, the force required to actuate the throw-out bearing and/or the force applied to a pressure plate can be varied in accordance with the geometry selected for the noses and the collector ring.

10 Claims, 2 Drawing Sheets

U.S. Patent  Dec. 27, 1988  Sheet 2 of 2  4,793,456
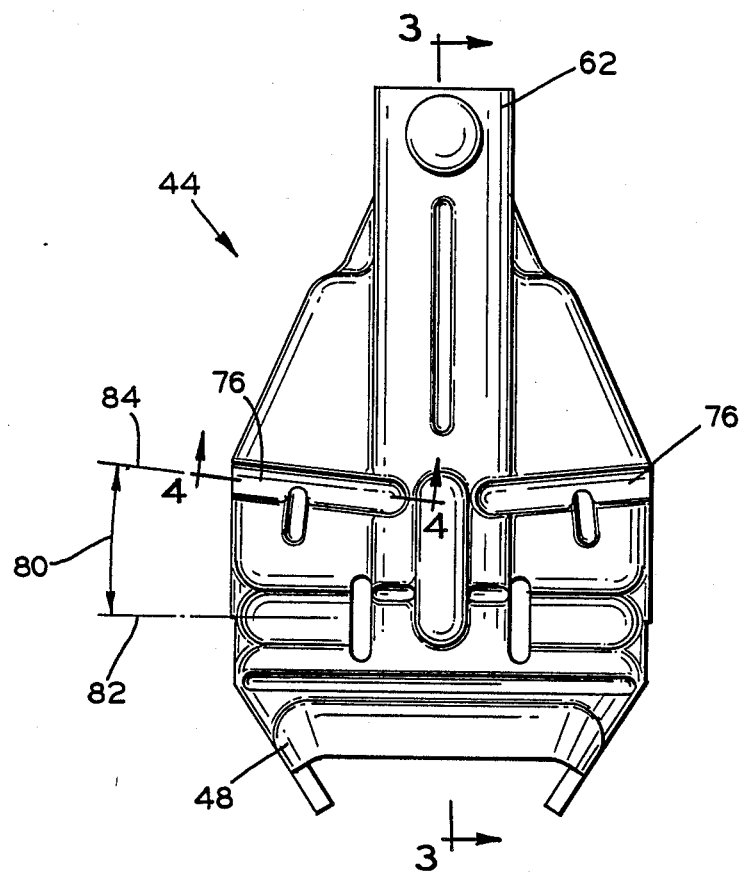
FIG. 2
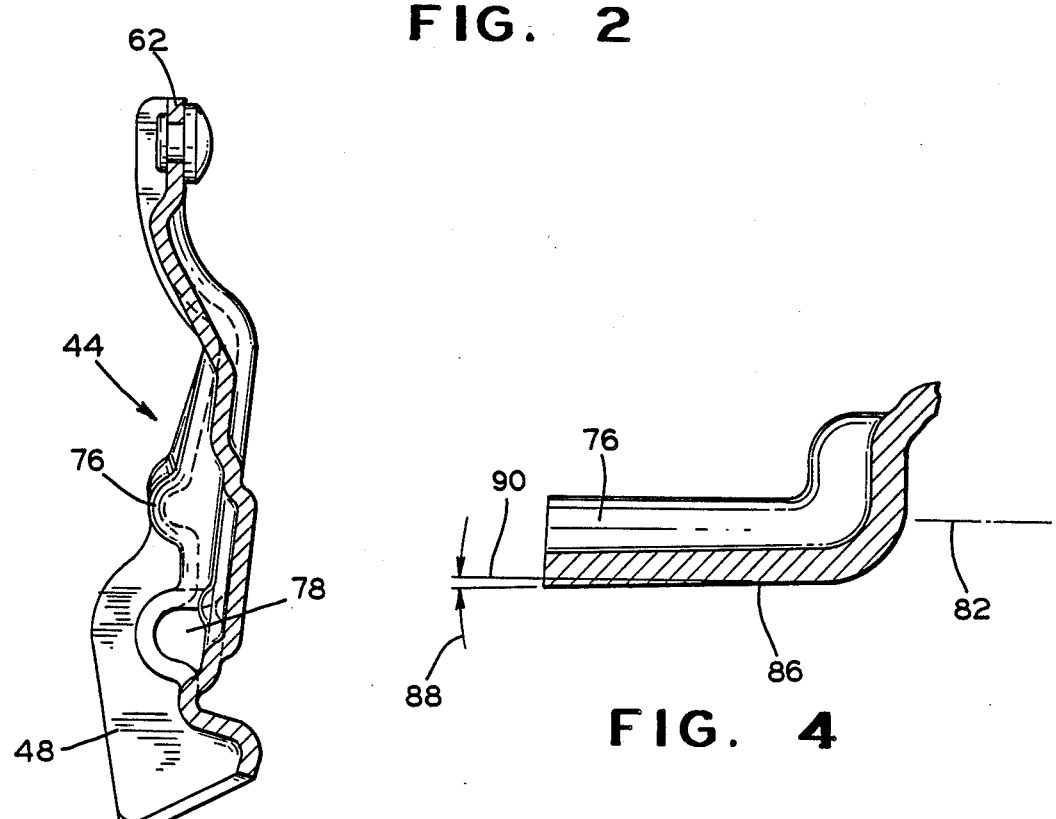
FIG. 3
FIG. 4

VARIABLE RATIO CLUTCH LEVER

BACKGROUND OF THE INVENTION

This invention relates to an improvement in the manufacture of friction clutches of the type employed in automotive vehicles, and more particularly to a clutch exhibiting generally constant actuating pressure.

In the prior art, clutches for vehicles were constructed such that an increasing force was required as the clutch pedal was depressed to actuate the clutch. The constantly changing force tended to make it difficult to smoothly operate the clutch and tiring to hold the clutch pedal down with the clutch in the disengaged position.

For example, U.S. Pat. No. 2,037,610 discloses a disk clutch in which a ring linked to a clutch pedal engages the inner ends of a plurality of radially extending levers having outer ends which are hingedly connected to a pressure ring of a clutch. The levers are pivoted intermediate the ends on a clutch encasing cover such that a longer lever arm is defined between the pivot point and the inner end of the lever and a shorter lever arm is defined between the pivot point and the outer end of the lever. As the clutch pedal is depressed, the force required to move the pressure ring to compress pressure springs increases.

U.S. Pat. No. 4,502,959 and U.S. Pat. No. 4,601,277 disclose a clutch of the type presently commercially available for use in vehicles. A plurality of clutch levers have inner ends which are engaged by a throw-out bearing and have outer ends which engage a pressure plate. The levers are pivotally connected to a clutch cover at points adjacent the outer ends. Intermediate the inner end and the pivot point there is formed a nose on each lever which nose engages a collector ring which in turn engages a Belleville spring to maintain the clutch in the engaged position. When the clutch pedal is depressed to disengage the clutch, the throw-out bearing is moved against the inner ends of the levers which pivot on the cover rotating the outer ends of the levers away from the pressure plate. At the same time, the noses move the collector ring to collapse the Belleville spring thereby releasing the axial pressure against the pressure plate. As in the previously described prior art clutch, a longer lever arm is defined between the pivot point and the inner end of the lever body and a shorter lever arm is defined between the pivot point and the nose. Thus, the force required to depress the clutch will increase with travel as the levers attempt to collapse the Belleville spring.

SUMMARY OF THE INVENTION

The invention described herein provides an economic means for achieving a generally constant clutch actuation pressure or other desired combinations of throw-out bearing and pressure plate load characteristics. A vehicle operator utilizes a clutch pedal linked to a throw-out bearing to disengage the clutch. The throw-out bearing engages the inner ends of axially extending levers which have outer ends rotatably mounted on a clutch cover and engaging a pressure plate. Each of the levers has a pair of noses formed between the pivot point and the inner end for engaging a collector ring which in turn encircles a Belleville spring. The Belleville spring applies a force to the levers to normally urge the pressure plate against a driven disc. Upon rotation of the levers about their pivot points by actuation of the throw-out bearing, the collector ring is moved to collapse the Belleville spring and release the pressure plate thereby disengaging the clutch.

In accordance with the present invention, the noses are formed with a longitudinal axis at an angle which tapers away from the longitudinal axis of the pivot point and toward the collector ring from the center of the lever toward its outer edge. Thus, the noses engage the collector ring at a point which moves along the longitudinal axis of the nose as the lever is pivoted about its pivot point thereby decreasing the distance between the point of contact and the pivot point which tends to maintain the throw-out bearing actuation pressure at a constant over the travel of the clutch. The noses can be formed in various other configurations which permit many combinations of throw-out bearing loads and pressure plate loads as desired.

BRIEF DESCRIPTION OF THE DRAWINGS

FIG. 2 is a plan view of a clutch lever according to the present invention as shown in FIG. 1;

FIG. 3 is a cross-sectional view of the clutch lever of FIG. 2 taken along the line 3—3; and FIG. 4 is a cross-sectional view of a portion of the clutch lever of FIG. 2 taken along the line 4—4.

DETAILED DESCRIPTION OF A PREFERRED EMBODIMENT

Figure 1:
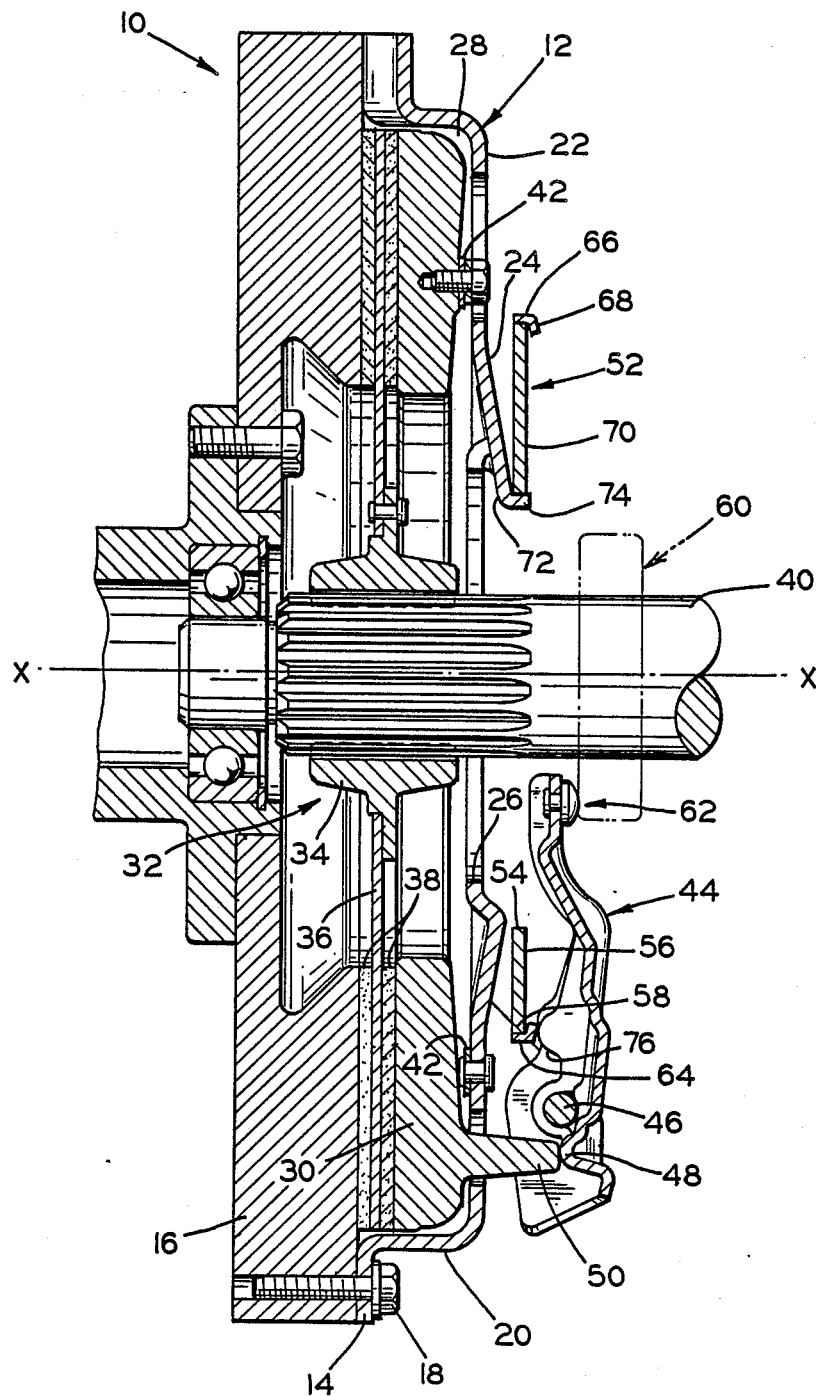
FIG. 1 is a cross section of a clutch employing the invention as described herein.

Referring to FIG. 1 of the drawings, a preferred embodiment of this invention involves a friction clutch shown generally at 10 and having a central axis X—X. The clutch 10, comprises an annular cover 12, which includes a peripheral flange portion 14. The latter portion 14 is secured to the rear face of a standard flywheel 16 by a plurality of circumferentially spaced bolts 18, so that the cover 12 rotates with the flywheel 16. The cover 12 further comprises a rim portion 20 extending in a generally axial direction, and an end wall 22 extending radially inwardly from the rim portion 20 and terminating in an angularly disposed ramp 24. The radially inner portion of the ramp 24 defines a central opening 26 in an end wall 22 of the cover 12.

An annular space 28 is provided between the flywheel 16 and the cover 12 for receiving a pressure plate 30. A driven disc 32 is adapted to be clamped between the pressure plate 30 and the flywheel 16.

The driven disc 32 comprises a central hub 34 having a support plate 36 secured thereto with friction facings 38 fastened on opposite sides of the support plate 36. The central hub 34 is splined to the outer end of a transmission input shaft 40 with the friction facings 38 positioned between the pressure plate 30 and the flywheel 16. The splined connection permits the driven disc 32 to move freely in an axial direction relative to the input shaft 40 while being rotatable with it. The pressure plate 30 is axially movable into engagement with the driven disc 32 to clamp the same against the flywheel 16 for drivingly connecting the rotatable drive and driven members of the clutch. A plurality of circumferentially spaced drive straps 42 rotatably connect the pressure plate 30 to the cover 12 and permit limited axial movement of the pressure plate 30 relative to the cover 12. The straps 42 further serve as a means to lift the pressure plate 30 away from the flywheel 16 when the clutch 10 is actuated to its disengaged position. The opposite ends of the drive straps 42 are connected to both the cover 12 and the pressure plate 30 in a conventional manner.

A lever operating mechanism is provided to move the pressure plate 30 axially relative to the cover 12 and into and out of engagement with the driven disc 32. The lever operating mechanism is disposed wholly outside the cover 12, and comprises a plurality of radially extending levers 44 pivotally connected to the cover 12 by pivot pins 46. Outer or tail ends 48 of each lever 44 engage integral bosses 50 formed on the pressure plate 30.

Resilient means 52 are provided to apply an axially engaging force to the pressure plate 30 to normally urge the same into clamping engagement with the driven disc 32. The resilient means is preferably designed to maintain a substantially constant pressure regardless of wear on the driven disc friction facing 38. In a preferred embodiment, the resilient means 52 is an annular Belleville spring 52, compressed between the cover 12 and the levers 44. The Belleville spring 52 in its unstressed state is conical in shape, having an inner peripheral portion 54, an intermediate cone-shaped portion 56, and an outer peripheral portion 58. Inner and outer peripheral portions 54 and 58 are axially spaced and approach the same plane as the spring 52 is placed under compression, the spring being designed to have the fixed inner peripheral portion 54 react against the cover 12, and the moveable outer peripheral portion 58 engage and be movable with the levers 44. Because of the spring movement, the cover ramp 24 is angled to permit clearance during operation.

The levers 44 are arranged to be depressed against the action of the spring 52 by a throw-out bearing 60 operating against inner or nose ends 62 of the levers 44. Operation of the throw-out bearing 60 causes the levers 44 to pivot about the pins 46. The outer ends 48 respond by moving the pressure plate 30 clampingly against the driven disc 32 to force the same against the flywheel 16.

To equally distribute load from the spring to the levers 44, an annular collector ring 64 is provided. The collector ring 64 is cup-shaped in cross-section, and comprises an annular, axially extending rim 66 which encircles the outer peripheral portion 58 of the spring 52, and has a radially inwardly extending annular base 68. The base 68 is adapted to be positioned between the back face of the spring 52, and adjacent the front face of the levers 44. Thus, the base 68 is disposed for transferring the reaction load of the spring 52 to the levers 44, and is disposed at a slight angle to provide clearance for the outer peripheral portion 58 when the levers 44 are pivoted to their clutch disengaged position. The collector ring 64 has sufficient clearance with respect to the outer peripheral portion 58 to permit it to move freely during the various clutch operating stages. Since the levers 44 are in constant contact with the collector ring base 68, they serve to hold the collector ring 64 in place against the spring 52. If desired, the spring 52 may bear directly against the levers 44; however, an equal distribution of the load will result from employment of the annular collector ring 64.

The outer peripheral portion 58 of the spring 52 is encircled by the collector ring 64 as described. The inner peripheral portion 54 contains a plurality of inwardly extending tongues 70. The tongues 70 are uniformly spaced apart, each tongue 70 extending into a corresponding recess 72 which in turn extends inwardly from the ramp 24. Each recess 72 contains side walls (not shown), and a lip 74 for the secure non-slipping engagement of the inner peripheral portion 54 of the spring 52 and the cover 12.

The operation of the clutch described is that of a conventional "push-type" clutch. Thus, in the normally engaged position of the clutch, the tongues 70 of the spring 52 will react in the recesses 72 of the cover 12. The outer periphery 58 of the spring 52 will urge the collector ring 64 axially outwardly against intermediate noses 76 of the levers 44. The levers 44 will then pivot about pins 46 and the outer ends 48 will exert an axially inward force against the pressure plate 30 through the pressure plate bosses 50.

To disengage the clutch, an operator will typically depress a clutch pedal with his left foot. This action will cause the throw-out bearing 60 to move axially inwardly against the inner ends or noses 62 of the levers 44. The intermediate noses 76 will then urge the collector ring 64 axially inwardly, thus collapsing the spring and causing inner and outer peripheral portions 54 and 58 thereof to lie in a common plane. The levers 44 will pivot about the pins 46, and the outer ends 48 thereof will release the axial pressure previously held against the pressure plate bosses 50.

Referring now to FIGS. 2 through 4, a preferred embodiment of the clutch lever 44, as employed in the aforedescribed clutch, includes a longitudinally extending body having the inner nose end 62, the outer or tail end 48, and an intermediate portion therebetween. The lever 44 is preferably comprised of a steel stamping, and includes a transversely extending bore 78 formed in the intermediate portion about which the lever 44 pivots on the aforementioned pin 46.

As best seen in FIG. 2, a pair of the noses 76 are formed in the intermediate portion between the inner end 62 and the bore 78. Each nose is formed at an angle 80 defined between a center line 82 of the bore 78 and a longitudinal axis 84 of the nose 76. In the preferred embodiment, the angle 80 is approximately six degrees.

As best shown in FIG. 4, a surface 86 of the nose 76 which abuts the collector ring 64 forms an angle 88 with a line 90 extending generally parallel to the center line 82 of the bore 78. In the preferred embodiment, the angle 88 is approximately one and one half degrees. The angles 80 and 88 lie in planes which are orthogonally related. Referring to FIG. 1, each of the noses 76 begins near the center of the lever 44 and tapers both toward the central axis X-X at the angle 80 and toward the collector ring 64 at the angle 88. Furthermore, the collector ring base 68 tapers at an angle of approximately seven degrees toward the nose 76 from the rim 66 toward the center of the ring.

In operation, as the throw-out bearing 60 is moved toward the pressure plate 30, each of the levers 44 is rotated about its associated pivot pin 46 and each of the noses 76 engages an adjacent portion of the collector ring 64. During the travel of the throw-out bearing 60, each of the noses 76 presents a knife-edge like surface to the facing surface of the collector ring 64. Since each of the noses 76 is formed at the angle 80 and the angle 88 and the ring base 68 tapers, the distance between the point of which the nose 76 abuts the collector ring 64 and the pivot point on the pivot pin decreases during rotation. Thus, as the force supplied to the collector ring 64 by the spring 52 tends to increase, there is no increase required in the force applied to the throw-out bearing 60 since the ratio of the respective lever arms is changing. The configuration of the noses 76 insures that a point contact is made along the surface 86 with the facing surface of the collector ring 64 which point moves from the outside edges of the lever 44 adjacent the center of the lever as the lever is rotated about the pivot pin 46.

In prior art clutches, the force required to depress the clutch pedal tends to increase with clutch pedal travel. Such force is directly related to the bearing load on the throw-out bearing. In a clutch configured in accordance with the present invention, the throw-out bearing load is relatively constant over the entire travel distance due to the decreasing length of the lever arm for the noses 76 versus the fixed length for the lever arm of the throw-out bearing 60. While specific angles have been disclosed in connection with the description of the preferred embodiment, the configuration of the noses 76 and the ring base taper can be altered to any desired combination of bearing loads and pressure plate loads. Furthermore, the present invention tends to reduce the Belleville spring travel which results in longer spring life.

In accordance with the provisions of the patent statutes, the present invention has been described in what is considered to represent its preferred embodiment. However it should be noted that the invention can be practiced otherwise than as specifically illustrated and described without departing from its spirit or scope.

What is claimed is:

1. A clutch lever adapted to be pivotally mounted on a clutch cover and engaged by a throw-out bearing for actuating a clutch collector ring comprising:

a longitudinal body having an inner end adapted to be engaged by a throw-out bearing, an outer end adapted to be pivotally mounted on a clutch cover, and an intermediate portion joining said inner and outer ends and adapted to engage a clutch collector ring;

a transversely extending bore formed in said intermediate portion and having a longitudinal axis defining a pivot point for said body; and at least one nose formed on said intermediate portion between said bore and said inner end and having a longitudinal axis extending at a first angle in a first plane including said longitudinal axis of said bore and extending at a second angle in a second plane including said longitudinal axis of said bore, said first and second planes being orthogonally related whereby said nose defines a changing contact point with a collector ring as said body is rotated about said pivot point to vary the distance between said contact point and said pivot point.

2. The lever according to claim 1 wherein said nose extends from a point adjacent a center of said intermediate portion to an outer peripheral edge of said intermediate portion.

3. The lever according to claim 1 wherein said said first angle is approximately six degrees with respect to said longitudinal axis of said bore.

4. The lever according to claim 1 wherein said first angle is approximately six degrees and wherein said second angle is approximately one and one half degrees.

5. The lever according to claim 1 including a pair of noses each located on opposite sides of a center of said intermediate portion and extending to opposed peripheral edges of said intermediate portion and each said nose having a longitudinal axis angled toward said inner end of said lever body from said center of said intermediate portion toward said peripheral edges of said intermediate portion.

6. A clutch comprising a cover, a plurality of radially extending levers movable relative to said cover, a throw-out bearing engagable with an inner end of each of said levers, a collector ring adjacent an intermediate portion of each of said levers, and nose means formed in said intermediate portion of said levers and having a longitudinal axis angled from a central point in said intermediate portion toward said inner end of each said lever and angled from said central point toward said collector ring.

7. The clutch according to claim 6 wherein said collector ring has a radially inwardly extending annular base which tapers towards said nose means from an outer peripheral edge of said base toward an inner peripheral edge of said base.

8. The clutch according to claim 7 wherein said taper of said collector ring base is approximately seven degrees.

9. A method of controlling the force required to disengage a clutch, the clutch including a cover, and a plurality of radially extending levers axially movable relative to the cover, each of the levers having an inner end engagable with a clutch throw-out bearing and an intermediate portion having nose means formed thereon and engagable with a collector ring, the method comprising the steps of:

a. selecting a first angle for a longitudinal axis of said nose means extending from a central point of said intermediate portion toward said inner end of the lever with respect to a longitudinal axis of rotation for the lever;

b. selecting a second angle for said longitudinal axis of said nose means extending from said central point of said intermediate portion toward a collector plate with respect to said longitudinal axis of rotation; and c. forming said nose means in said lever with a longitudinal axis extending at said first angle and said second angle with respect to said longitudinal axis of rotation for the lever.

10. The method according to claim 9 including a step of forming a collector ring with a radially inwardly extending annular base tapered from an outer peripheral edge to an inner peripheral edge toward the nose means of the levers.

* * * * *